(12) United States Patent
McRae

(10) Patent No.: US 7,236,493 B1
(45) Date of Patent: Jun. 26, 2007

(54) INCREMENTAL COMPILATION FOR CLASSIFICATION AND FILTERING RULES

(75) Inventor: Andrew McRae, Berowra (AU)

(73) Assignee: Cisco Technology, Inc., San Jose, CA (US)

( * ) Notice: Subject to any disclaimer, the term of this patent is extended or adjusted under 35 U.S.C. 154(b) by 1029 days.

(21) Appl. No.: 10/170,896

(22) Filed: Jun. 13, 2002

(51) Int. Cl.
H04L 12/28 (2006.01)

(52) U.S. Cl. .................................. 370/392; 370/401

(58) Field of Classification Search ............... None
See application file for complete search history.

(56) References Cited

U.S. PATENT DOCUMENTS

| | | |
|---|---|---|
| 5,027,350 A | 6/1991 | Marshall |
| 5,473,607 A | 12/1995 | Hausman et al. |
| 5,509,006 A | 4/1996 | Wilford et al. |
| 5,852,607 A | 12/1998 | Chin |
| 5,872,783 A | 2/1999 | Chin |
| 5,881,242 A | 3/1999 | Ku et al. |
| 5,917,820 A | 6/1999 | Rekhter |
| 5,951,651 A * | 9/1999 | Lakshman et al. ........... 709/239 |
| 6,091,725 A | 7/2000 | Cheriton et al. |
| 6,167,445 A | 12/2000 | Gai et al. |
| 6,219,706 B1 | 4/2001 | Fan et al. |
| 6,243,667 B1 | 6/2001 | Kerr et al. |
| 6,282,546 B1 | 8/2001 | Gleichauf et al. |
| 6,308,219 B1 | 10/2001 | Hughes |
| 6,324,656 B1 | 11/2001 | Gleichauf et al. |
| 6,341,130 B1 * | 1/2002 | Lakshman et al. ........... 370/389 |
| 6,377,577 B1 | 4/2002 | Bechtolsheim et al. |
| 6,529,508 B1 * | 3/2003 | Li et al. ...................... 370/392 |
| 6,778,530 B1 * | 8/2004 | Greene ....................... 370/389 |

OTHER PUBLICATIONS

Pankaj Gupta and Nick McKeown, Packet Classification on Multiple Fields, ACM SIGCOMM '99, Sep. 1999, Harvard University, pp. 1-14.
T.V. Lakshman and D. Stiliadis, High-Speed Policy-based Packet Forwarding Using Efficient Multi-dimensional Range Matching, 1998, pp. 203-214.
U.S. Appl. No. 09/557,480, Andrew McRae.
U.S. Appl. No. 10/072,824, Li et al.

* cited by examiner

Primary Examiner—Chau Nguyen
Assistant Examiner—Jung Park
(74) Attorney, Agent, or Firm—Cesari & McKenna, LLP

(57) ABSTRACT

A technique classifies packets in a manner that is both deterministic and efficient. A hierarchical arrangement of lookup tables is organized into levels to classify the packets. Entries contained in the lookup tables are incrementally built and added to the lookup tables as packets are classified. A packet is divided into a series of fields and a first-level lookup table is built for each of these fields. Successive-level-lookup tables are then allocated and initialized to contain "missing" entries. When a packet is classified, it is applied to the first-level lookup tables to produce a series of indices. These indices are then applied to the second-level lookup tables to select indices that are the applied to a next-level table and so on until an outcome index is selected from a final-level lookup table. If the entry selected in the second-level lookup table is empty the successive-level entries are built and the classification is retried.

20 Claims, 13 Drawing Sheets

|  |  | 425 | 430 | 440 | 450 | | | |
|---|---|---|---|---|---|---|---|---|
| 420a | access-list | 101 | deny | tcp | 192.100.0.0 | 255.255.0.0 | eq | smtp |
| 420b | access-list | 101 | permit | ip | 192.100.0.0 | 255.255.0.0 | | |
| 420c | access-list | 101 | permit | ip | 192.101.0.0 | 255.255.0.0 | | |
| 420d | access-list | 101 | deny | tcp | any | any | eq | 21 |
| 420e | access-list | 101 | deny | udp | any | any | eq | 80 |

INCREMENTAL COMPILATION FOR CLASSIFICATION AND FILTERING RULES

CROSS-REFERENCE TO RELATED APPLICATIONS

The present invention is related to co-pending and commonly assigned U.S. patent application Ser. No. 09/557,480, now issued as U.S. Pat. No. 6,970,462, titled, "A Method for High Speed Packet Classification," which was filed on Apr. 24, 2000 and U.S. patent application Ser. No. 10/072,824 titled "Method for Classifying Packets Using Multi-Class Structures" which was filed on Feb. 8, 2002.

BACKGROUND OF THE INVENTION

1. Field of the Invention

The invention relates generally to the classification and/or filtering of data packets, and more specifically to the high speed filtering and/or classification of data packets.

2. Background Information

In a communications network, there is a well-recognized need to classify information units, such as packets, that are passed between the various network devices in the network, e.g., routers and switches, in order to support a wide range of applications, such as security control, packet filtering, Class of Service (CoS) and Quality of Service (QoS). Often in such networks, these network devices use access control lists (ACLs) to, inter alia, classify packets for these applications.

An ACL typically comprises an ordered list of access control entries (ACEs), i.e., rules, where each rule defines a pattern (criterion) that is compared with received packets. The pattern could specify a particular source or destination address, a protocol or some other field that is looked for in the packet. For example, the pattern might be defined to look for a specific protocol in the packet's header such as, the Transmission Control Protocol (TCP) or the Internet Protocol (IP). The pattern is used to determine if the rule applies to the packet. If the pattern is found in the packet, the rule is said to apply to the packet.

Associated with each rule is an action that specifies the act to be taken if the rule applies. In its simplest form, this action may be to allow the matched packet to proceed towards its destination, i.e., "permit," or to stop the packet from proceeding any further, i.e., "deny." Conversely, if there is no match to any of the ACL's rules, the action may be to drop the packet, i.e., "a final deny." In a more sophisticated form, complex policies and filtering rules may be implemented in the ACL to determine the course of the data packet.

Typically, a packet is classified by searching for the first rule in the ACL that applies to the packet. The number of rules involved and the amount of processing time needed to make this determination often depends on the approach taken. For example, one approach would be to run through the list of rules starting from the first rule in the list and continuing towards the last rule in the list until a matching rule, i.e., a rule that applies to the packet, is found. This approach is simple, but is not very efficient. For example, the time spent processing each packet may vary depending on the packet. Packets that meet the criteria associated with rules earlier in the list will be processed faster than packets that meet criteria associated with rules that are positioned farther down the list.

One approach to obtaining an overall faster processing of packets is to predetermine the frequency of the matching of the various rules and to place the most selected rules at the top of the list. However, this method is highly dependent on the packet mix and is not very efficient should this mix change. Another approach would be to implement a technique whereby packets are classified using a predetermined number of lookup operations such as described in commonly owned co-pending U.S. patent application Ser. No. 09/557,480, now issued as U.S. Pat. No. 6,970,462, titled, "A Method for High Speed Packet Classification," which was filed on Apr. 24, 2000, by Andrew McRae and hereinafter referred to as "McRae."

McRae describes a technique whereby a packet's header is divided into sections. These sections are applied to a hierarchy of lookup tables that represent all possible combinations of matching rules for all values of the packet header sections to determine an outcome such as, e.g., a first matching rule that applies to the packet. These lookup tables must exist before a packet can be classified. Computing resources, such as processor time and memory, needed to generate these lookup tables depends in part on the number of rules in the ACL. Generally, as the number of rules in the ACL increases, the computing resources needed to build and hold the lookup tables increases. In systems where computing resources are limited, the number of rules that the technique can support may be limited due to the limited resources available.

SUMMARY OF THE INVENTION

The present invention incorporates a technique for classifying packets in a manner that is deterministic and efficient. The inventive technique is deterministic in that it uses a hierarchical arrangement of lookup tables containing a first level and one or more successive levels to classify packets in a fixed number of lookup operations. Moreover, the inventive technique is efficient in that it does not require that the lookup tables contain a complete set of entries that represent all possible combinations of matching rules before a packet can be classified, thereby saving valuable computing resources.

Briefly, a packet is divided into a series of sections where each section is associated with a plurality of section values. A first-level lookup table and equivalence set is generated for each of these sections, where each entry contained in the equivalence set is associated with one or more rules contained in the ACL. Each entry in the first-level lookup table associates a section value with an equivalence set entry. Next, depending on the number of sections, one or more successive-level lookup tables are generated to complete the lookup table hierarchy. The entries in the successive-level tables are then initialized to indicate they are "missing," i.e., empty. When a packet is classified, it is applied to the first-level lookup tables to generate a set of first-level indices. These first-level indices are then applied to the successive-level lookup tables to generate a set of successive-level indices that are then applied to the next-level of tables in the successive-level tables to generate a set of next-level successive-level indices. The process continues until a final-level table index is generated. If the successive-level indices indicate that a successive-level lookup table entry is empty, the successive-level entries are built and the classification is retried.

Advantageously, the inventive technique enables packets to be classified in a deterministic and efficient manner without requiring that all possible outcomes be determined before packet classification can take place, thereby saving time and computing resources. Moreover since only entries that are actually used in the packet classification process are compiled and added to the lookup tables, the inventive technique enables systems with limited resources to handle a larger number of rules that might otherwise not be possible using other classification techniques.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 4 is an example of an access control list that can be used with the present invention;

DETAILED DESCRIPTION OF AN ILLUSTRATIVE EMBODIMENT

Figure 1:
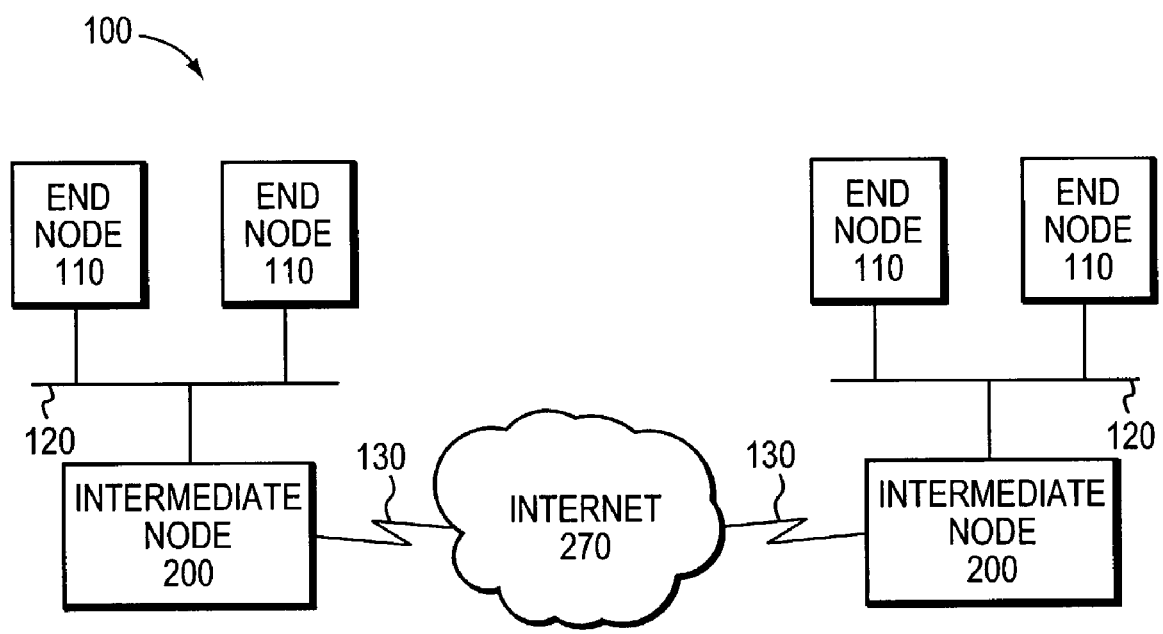
FIG. 1 is a schematic block diagram of a network that can be advantageously implemented with the present invention.

FIG. 1 is a schematic block diagram of a computer network 100 that can be advantageously used with the present invention. The computer network 100 comprises a collection of communication links and segments connected to a plurality of nodes, such as end nodes 110 and intermediate nodes 200. The network links and segments may comprise local area networks (LANs) 120 and wide area network (WAN) links 130 interconnected by intermediate nodes 200, such as network switches or routers, to form an internetwork of computer nodes. These internetworked nodes communicate by exchanging data packets according to a predefined set of protocols, such as the Transmission Control Protocol/Internet Protocol (TCP/IP) and the Asynchronous Transfer Mode (ATM) protocol.

Figure 2:
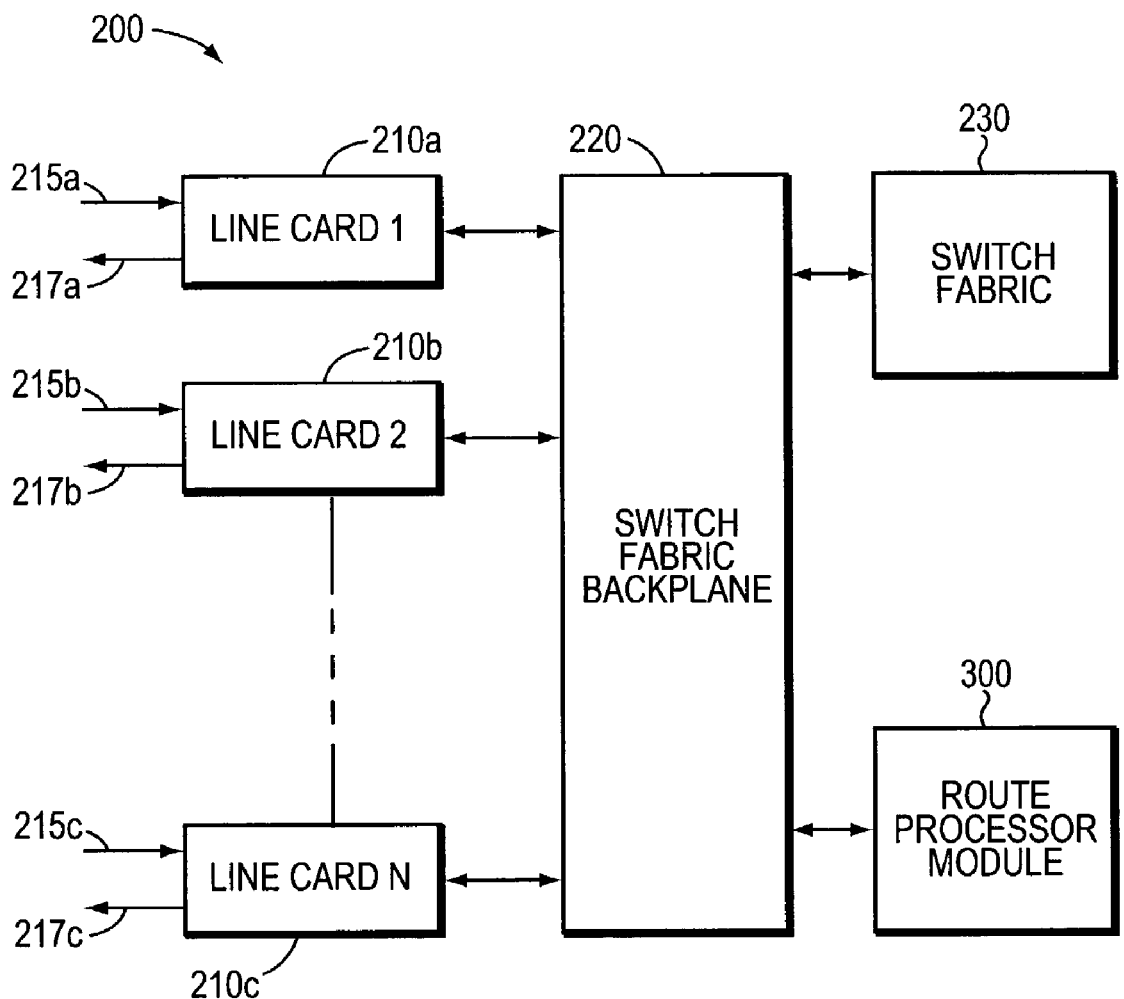
FIG. 2 is a partial schematic block diagram of an intermediate node that can advantageously implement the present invention.

FIG. 2 is a partial block diagram of a typical intermediate node (switch) 200 that can advantageously implement the present invention. An example of an intermediate node 200 that could be used in the computer network 100 is the Cisco MGX 8850 IP+ATM Multiservice Switch, available from Cisco Systems, Incorporated, San Jose, Calif. The MGX 8850 is designed for service providers deploying narrowband and/or broadband services. The MGX 8850 scales from DS0 to OC48c and supports various services, such as frame relay, ATM, Voice over IP, circuit emulation, IP, wireless aggregation, DSL aggregation, ATM service backbones and Virtual Private Networks (VPN's). The intermediate node 200 comprises a plurality of cards including line cards 210, a switch fabric card 230 and a route processor module 300 card interconnected by a switch fabric backplane 220.

The line cards 210 connect (interface) the switch 200 with the network 100. To that end, the line cards 210 receive and transmit data over the network through input 215 and output ports 217, respectively, using various protocols, such as OC-48c, DS0, T3 and so on. The line cards 210 also forward data received from the network to the switch fabric backplane 220, as well as transmit data received from the switch fabric backplane 220 to the network.

The switch fabric backplane 220 comprises logic and a backplane that provides an interface between the line cards 210, the switch fabric card 230 and the route processor module card 300. For example, the switch fabric backplane 220 provides interconnections between the cards that allow data and signals to be transferred from one card to another.

The switch fabric card 230 comprises switch fabric logic (switch fabric) that is configured to switch data between the cards coupled to the switch fabric backplane 220. For example, assume a packet is sent from a line card 210 to the switch fabric card 230. The switch fabric card 230 applies the packet header associated with the packet to the switch fabric logic and selects a destination card, such as the route processor card 300, that is to receive the packet. The packet is then switched to the destination card.

Figure 3:
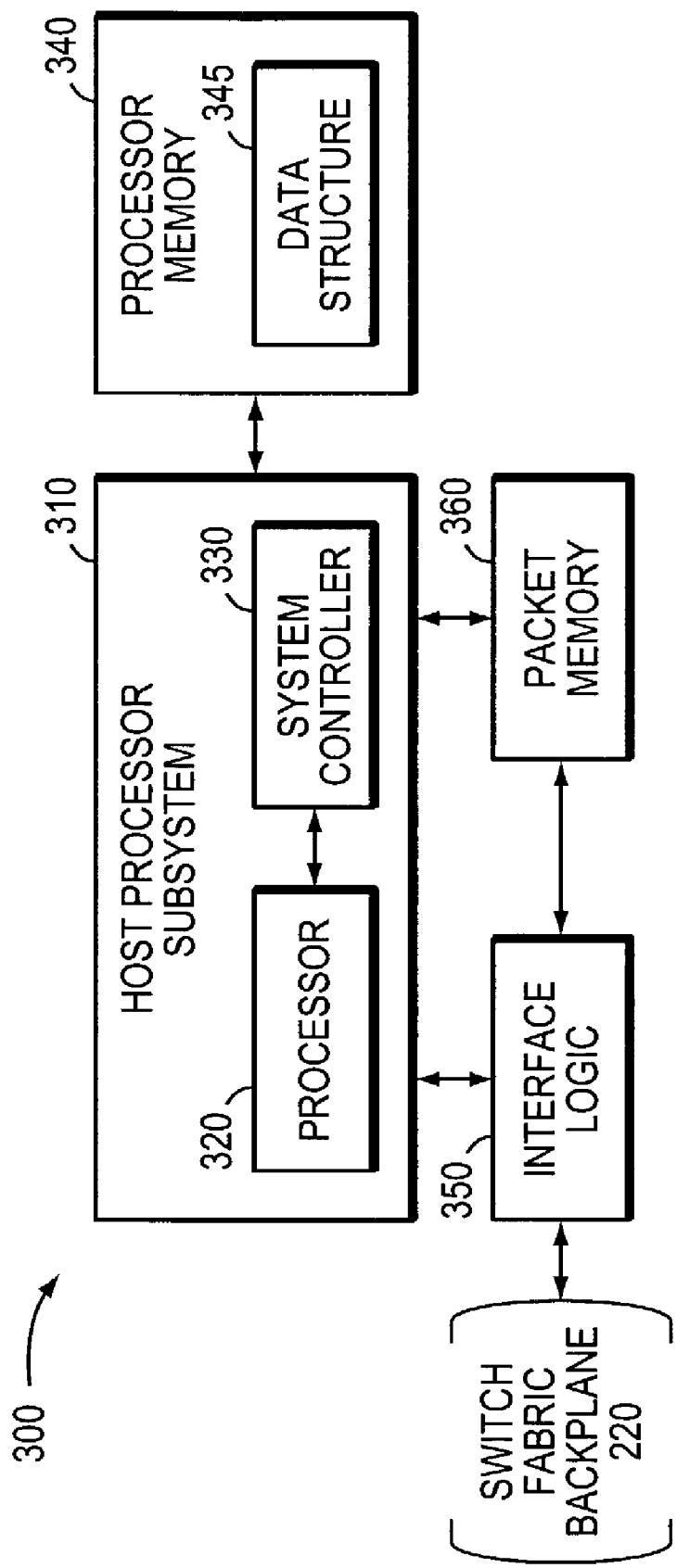
FIG. 3 is a partial schematic block diagram of a route processor module that can advantageously implement the present invention.

The route processor (RP) module 300 is adapted to provide, inter alia, layer 3 processing for incoming packets. FIG. 3 is a partial block diagram of the route processor module 300 comprising a host processor subsystem 310, processor memory 340, interface logic 350 and packet memory 360. The host processor 310 further comprises a processor 320 coupled to a system controller 330. The processor 320 comprises processing elements and logic that are capable of executing instructions and generating memory requests. An example of a processor that may be advantageously used with the route processor module 300 is the MIPS 10000 processor available from Silicon Graphics Incorporated, Mountain View, Calif. The system controller 330 is preferably embodied in a high performance Application Specific Integrated Circuit (ASIC), which is configured to interface the processor 320 with the processor memory 340 and the packet memory 360.

The processor memory 340 is a computer readable medium that holds executable instructions and data that are used by the processor 320 and enable (adapt) the processor 320 to perform various functions. These functions include methods for performing the present invention. The processor memory 340 comprises one or more memory devices (not shown) that are capable of storing executable instructions and data. Preferably, these memory devices are industry standard memory devices such as, Synchronous Dynamic Random Access Memory (SDRAM) devices available from Micron Technology, Inc., Boise, Id.

The interface logic 350 comprises hardware logic that, inter alia, provides an interface that allows data and signals to be transferred between the packet memory 360, the host processor 310 and the switch fabric backplane 220.

The packet memory 360 comprises memory devices (not shown) capable of storing packets received by the interface logic 350. Preferably, these memory devices are industry standard high-speed memory storage devices, such as Rambus Dynamic Random Access Memory (RDRAM) devices available from Rambus, Inc., Los Altos, Calif.

Broadly stated, packets are received from the network 100 by the line cards 210 and sent over the switch fabric backplane 220 to the switching fabric 230 for further processing. The switching fabric 230 examines header information contained in the packets and forwards the packets to the appropriate card coupled to the switch fabric backplane 220. Packets destined for the route processor module 300 are received by the interface logic 350 and placed in the packet memory 360. The interface logic 350 informs the host processor 310 of the arrival of a packet. The processor 320 processes the packet in part by issuing requests to the system controller 330 to access the packet data stored in the packet memory 360. Further processing, including classifying the packet in accordance with the present invention, is performed by executing instructions and manipulating data stored in the processor memory 340. The processor memory 340 includes a data structure 345 for storing information that is used to classify the packets. Preferably, this data structure 345 is comprised of a hierarchical arrangement of lookup tables and equivalence sets that are configured using the techniques of the present invention.

Suppose, for example, a user wishes to create data structure 345 on network device 200 for use in classifying packets in accordance with an access control list (ACL). The user might begin by accessing network device 200 and entering a series of commands or statements to define the ACL. FIG. 4 illustrates a series of statements the user might enter to define this ACL. The ACL 400 contains a series of rules 420a–e each of which specify a directive 425, an access group number 430, an action 440 and matching criteria 450. The directive 425 directs the system to interpret the command as an ACE, i.e., rule. The access group number 430 defines the access group associated with the rule. The action 440 defines the action to be taken if the rule is found to apply to the packet being classified. The matching criteria 450 defines the criteria a packet must meet (match) in order for the rule to apply. Typically, packets are classified in accordance with an ACL by finding the first rule in the list that applies to the packet, then taking the action specified in the matching rule.

Figure 5:
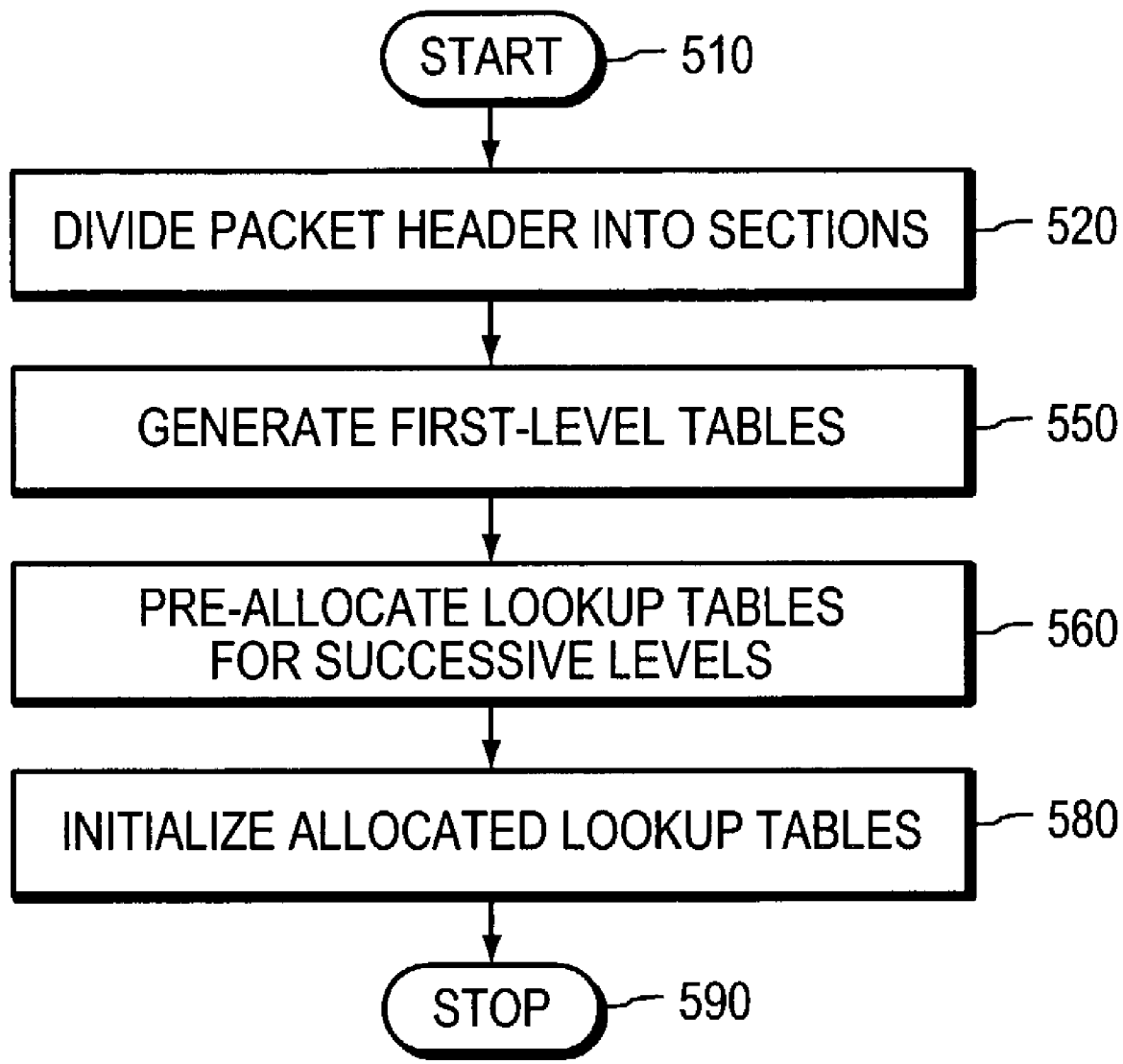
FIG. 5 is a high-level flow diagram of a sequence of steps that can be used to build a series of first-level lookup tables and allocate successive-level lookup tables in accordance with the present invention.

Now suppose the user wishes to direct network device 200 to create data structure 345 from the information specified in ACL 400. The user may enter a series of commands to direct device 200 to build data structure 345. FIG. 5 is a high-level flow diagram of a sequence of steps that network device 200 can use to create data structure 345. The sequence begins at Step 510 and proceeds to Step 520 where a template of the packet header is used to divide a packet's header into separate disjoint sections.

Figure 6:
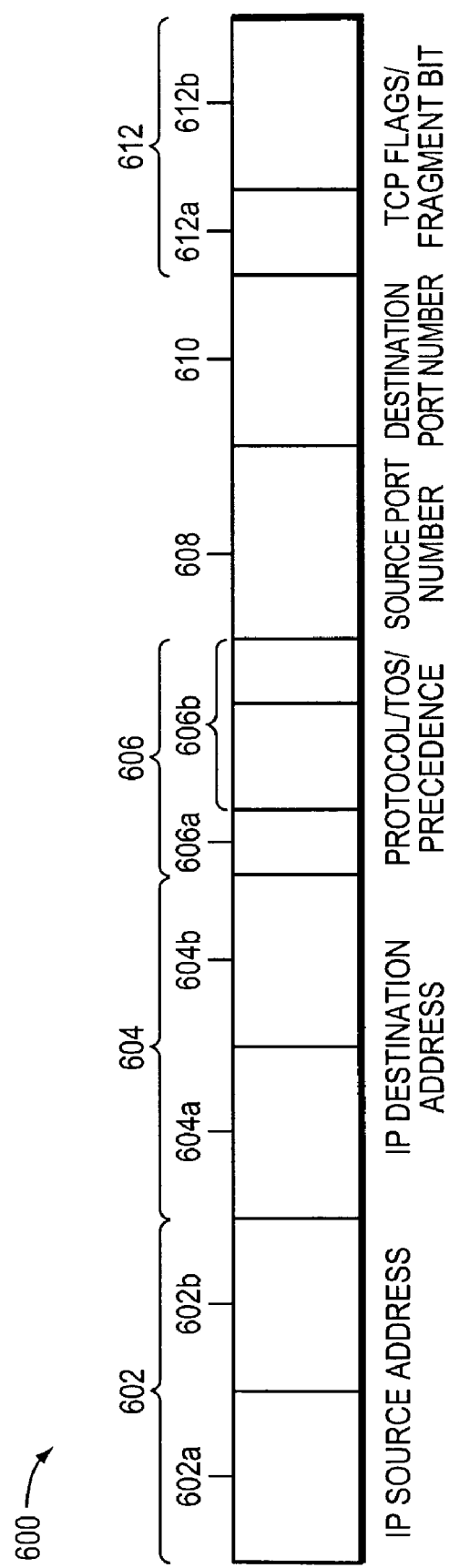
FIG. 6 is a packet header template that can be used to divide a TCP packet header into sections for use in forming first-level lookup tables and equivalence sets that can be used with the present invention.

FIG. 6 is a packet header template 600 that can be used to divide a TCP packet header in accordance with the invention. Packet header template 600 defines a plurality of fields including an IP source address field 602, an IP destination address field 604, a protocol field/type of service (TOS)/precedence field 606, a source port number field 608, a destination port number field 610, and a TCP flags/fragment bit field 612. Though the size of each section can vary, preferably, the length of each section is equal-sized. For example, template 600 divides a TCP header into eight 16-bit equal-length sections comprising sections 602a, 602b, 604a, 604b, 606, 608, 610 and 612. The IP source address 602 comprises two 16-bit sections that include the upper 16 bits of the IP source address section 602a and the lower 16 bits of the IP source address section 602b. Likewise, the IP destination address 604 comprises two 16-bit sections that include the upper 16 bits of the IP destination address section 604a and the lower 16 bits of the IP destination address section 604b. Section 608 comprises the source port number field and section 610 comprises the destination port number 610 field. Some smaller fields such as the protocol 606a and TOS/precedence 606b field are grouped together to form a 16-bit section 606. Likewise, the TCP flags field 612b is combined with the IP Fragment bit 612a to form a 16-bit section 612.

Taking one of these sections, such as the upper 16 bits of the IP source address section 602a, and applying it to the rules included in ACL 400, the following rule set illustrated in Table 1 can be formed where "0.0" represents "any value":

TABLE 1

| Rule Number | Value | Mask |
| --- | --- | --- |
| 1 | 192.100 | 255.255 |
| 2 | 192.100 | 255.255 |
| 3 | 192.101 | 255.255 |
| 4 | 0.0 | 0.0 |
| 5 | 0.0 | 0.0 |

From this rule set an "equivalence set" can be formed. Basically, an equivalence set is a set of unique values that exist across all rules for a particular packet header section. For each entry in the equivalence set, an indication (matching rule bitmap) is kept for those rules associated with the entry, the rationale being that a packet section value may appear in more than one rule. For example, ACL 400 contains five rules, thus each matching rule bitmap is five bits in length (i.e., one bit for each rule). The value "192.100/255.255" appears in both rules 1 and 2 above, thus, the matching rule bitmap value associated with this value is "11000." By using a matching rule bitmap, rules associated with each equivalence set entry may be tracked. Each unique matching rule bitmap value is further assigned an equivalence set index value. So for the example above, the following equivalence set, shown in Table 2, is created:

TABLE 2

| Value/Mask | Equivalence Set Index | Matching Rule Bitmap 1 2 3 4 5 |
| --- | --- | --- |
| 0.0/0.0 | 1 | 0 0 0 1 1 |
| 192.100/255.255 | 2 | 1 1 0 1 1 |
| 192.101/255.255 | 3 | 0 0 1 1 1 |

By comparing Table 1 with Table 2, one can see that compression has taken place in that out of the five rules within this section there are only three possible outcomes, i.e., equivalence set index entries 1, 2 and 3. Thus, after determining how many unique intervals there are in the section value range from zero to 65535, the preliminary equivalence set reduces the original rules down to a minimal data set. This concept is used to build the first-level lookup tables that map each 16-bit section value to a smaller index value.

Figure 7:
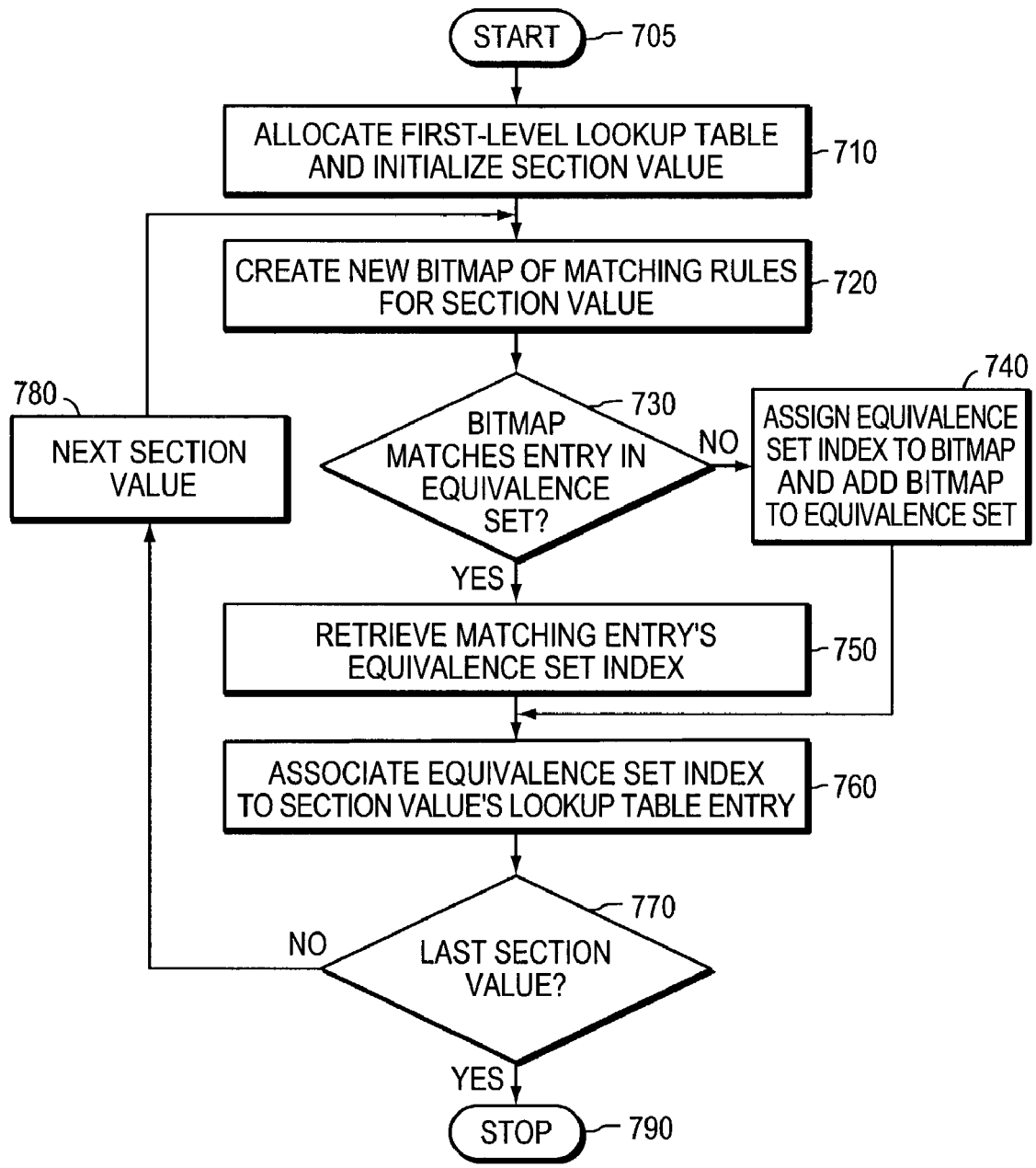
FIG. 7 is a flow diagram of a sequence of steps that can be used to create a series of first-level lookup tables in accordance with the present invention.

Referring again to FIG. 5 Step 550, the first-level lookup tables and equivalence sets are built for each of the sections. Preferably each first-level lookup table is organized as a one-dimensional array that is indexed by a section value and each entry is configured to hold an index value. Likewise, each equivalence set is organized as a one-dimensional array that is indexed by an index value and each entry is configured to hold a bitmap that represents a set of matching rules, i.e., matching rule bitmap. FIG. 7 is a flow diagram illustrating a sequence of steps that can be used to build the first-level lookup table and equivalence set for a section. Basically, the sequence iterates through all possible section values and associates the section value with an equivalence-set entry.

The sequence begins at Step 705 and proceeds to Step 710 where the first-level lookup table associated with the section is allocated and the section value is initialized to a starting value, preferably zero. Next at Step 720, a new matching rule bitmap that represents the matching filter rules associated with the section value is created. A more detailed description as to how this new matching rule bitmap is created will be described below. At Step 730, the equivalence set is searched to determine if an entry exists that matches the new matching rule bitmap. If a matching entry is not found, the sequence proceeds to Step 740, where a new entry containing the new matching rule bitmap is added to the equivalence set and a new equivalence set index is associated with the entry; otherwise, the sequence proceeds to Step 750 where the equivalence set index associated with the matching value is retrieved. At Step 760, the equivalence set index is then associated with the lookup table entry associated with the section value. Next at Step 770, a check is performed to determine if the section value is the last section value to be processed. If not, the next section value is calculated as indicated at Step 780 and the sequence returns to Step 720; otherwise, the sequence proceeds to Step 790 where the sequence ends. Steps 720 to 780 are repeated until all of the section values from the starting value to the last value have been processed. For example, for a 16-bit section Steps 720 to 780 are repeated for all section values from zero to 65535.

Figure 8:
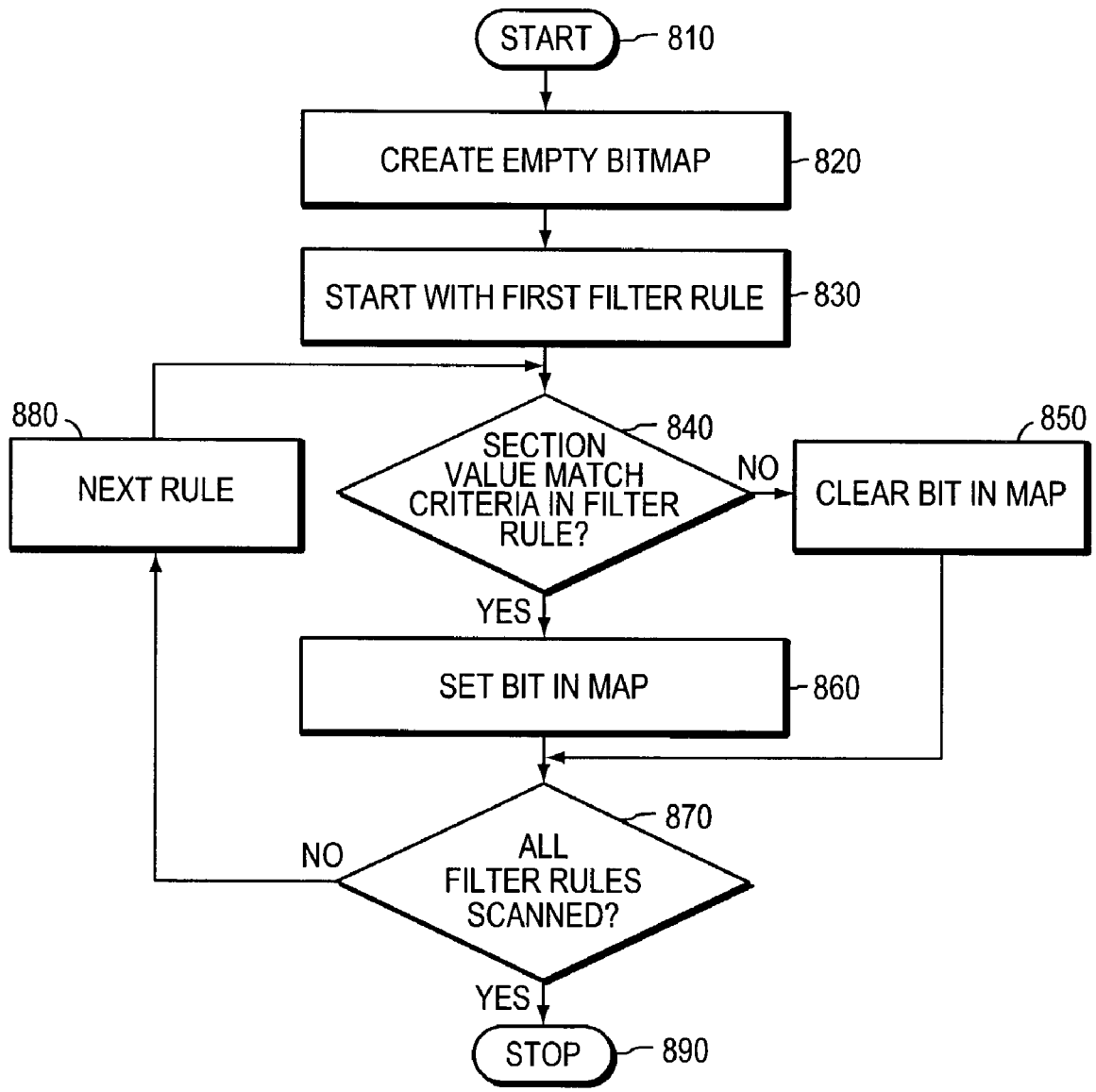
FIG. 8 is a flow diagram of a sequence of steps that can be used to create a matching rule bitmap associated with a section value that can be used advantageously used with the present invention.

FIG. 8 is a flow diagram of a sequence of steps that can be used to create a matching rule bitmap for a given section value from the matching rules contained in the ACL. The sequence begins at Step 810 and proceeds to Step 820, where an empty bitmap is created. Preferably, this bitmap comprises at least one bit for each of the matching rules. Next at Step 830, starting with the first matching rule the section value is compared to the matching rule's criteria to determine if the section value matches the rule criteria i.e., the rule applies to the particular section value, as indicated at Step 840. If the rule applies, the sequence proceeds to Step 860 where the bit associated with the rule in the bitmap is set; otherwise, the sequence proceeds to Step 850 where the associated bit is cleared. A check is then performed to determine if all of the matching rules have been processed, as indicated at Step 870. If not, the sequence proceeds to Step 880 where the next matching rule is located, and then returns to Step 840. Steps 840–880 are repeated until all of the matching rules have been processed, at which point the sequence ends (Step 890).

Table 3 illustrates the first-level lookup table and equivalence set that is created when the above techniques are applied to the packet header section associated with the upper 16 bits of the source IP address for ACL 400.

TABLE 3

| Packet Header Section Value | Equivalence Set Index | Matching Rule Bitmap 1 2 3 4 5 |
|---|---|---|
| 0 to 49251 and 49254–65535 | 1 | 0 0 0 1 1 |
| 49252 | 2 | 1 1 0 1 1 |
| 49253 | 3 | 0 0 1 1 1 |

The above sequences are further applied to create the first-level lookup tables and equivalence sets for each of the eight sections associated with the packet's TCP header template, thus yielding eight first-level lookup tables. Table 4 illustrates the first-level lookup table and equivalence set that is created when the above sequences are applied to the section associated with the lower-sixteen bits of the IP source address for ACL 400.

TABLE 4

| Packet Header Section Value | Equivalence Set Index | Matching Rule Bitmap 1 2 3 4 5 |
|---|---|---|
| 0 to 255 and 257 to 65535 | 1 | 0 0 0 1 1 |
| 256 | 2 | 1 1 1 1 1 |

Referring again to FIG. 5, at Step 560, lookup tables are pre-allocated for each successive level beyond the first level in the lookup-table hierarchy. In the example above, there are eight first-level lookup tables. The equivalence sets associated with these tables are merged, in a manner as will be described below, to form four second-level lookup tables and equivalence sets. The second-level equivalence sets are, in turn, merged to form two third-level lookup tables and equivalence sets, the latter of which are likewise merged to form a single fourth (final) level lookup table and equivalence set. Thus in the above example at Step 560, seven lookup tables in total are pre-allocated for successive levels two through four. Preferably these lookup tables are two-dimensional arrays that are indexed by index values held by the lookup tables of the previous level and each of the entries in the successive-level lookup table is configured to hold an index value.

The size of each allocated successive-level lookup table depends on the number of entries in the table and the size of each entry. The size of each entry should be large enough to hold an index value. The maximum number of entries in the successive-level lookup table can be determined by multiplying the number of entries in the two prior-level equivalence sets being merged. For example, in the above-described example the first-level equivalence set for the upper sixteen bits of the IP source address contains three entries and the first-level equivalence set for the lower sixteen bits of the IP source address contains two entries. Thus, the maximum number of entries in the second-level equivalence set is six.

At Step 580, each entry in the allocated successive-level lookup tables is initialized, preferably to zero, to indicate that the entry is "missing," i.e., it is empty and does not contain a valid index value. The sequence then ends at Step 590.

Figure 9:
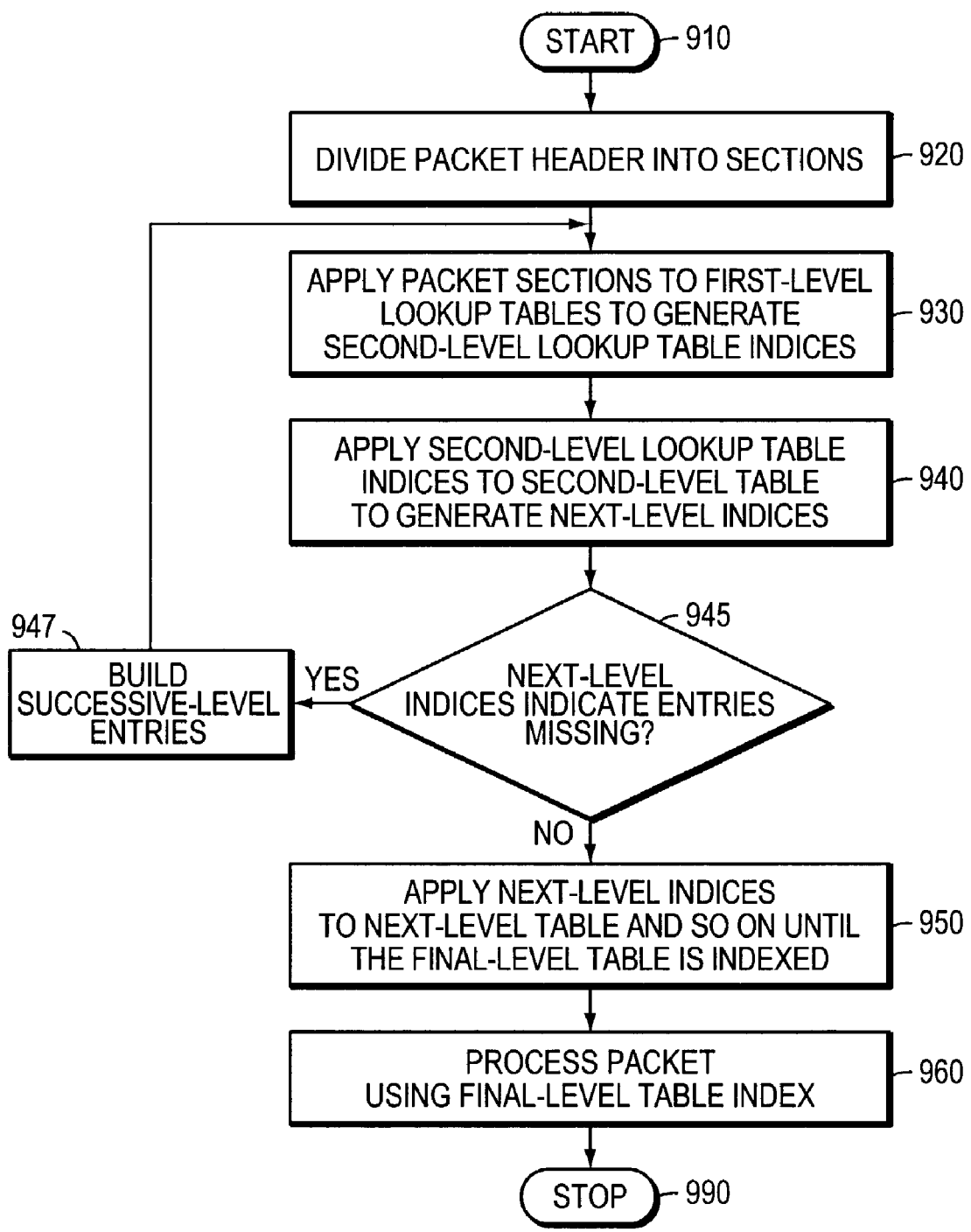
FIG. 9 is a high-level flow diagram of a sequence of steps that can be used to classify a packet in accordance with the present invention.

FIG. 9 is a flow chart of a sequence of steps that can be used to classify a packet in accordance with the present invention. The sequence begins at Step 910 and proceeds to Step 920 where a network packet's header is sectioned as described above. Next at Step 930, each section is applied to their respective first-level lookup table to generate a set of second-level lookup table index values. These second-level indices are then applied to the second-level lookup table to generate the next-level indices associated with the next level of lookup tables, if any, in the hierarchy, as indicated at Step 940. At Step 945, a check is performed to determine if the next-level indices indicate that the second-level lookup table entries are missing, which in the preferred embodiment means the next-level index values are zero. If so, the sequence proceeds to Step 947 where the successive-level, i.e., second-level and beyond, lookup table and equivalence set entries associated with the section values are built.

Basically, a successive-level equivalence set entry is built by calculating the cross-product of the equivalence-set entries from the prior level. Cross-producting is a technique whereby two entities are logically ANDed to produce a cross-product. For example, assume a bitmap B1 contains the value "00111" and a bitmap B2 contains the value "11110". The cross-product of these bitmaps is calculated by logically ANDing the value of B1, i.e., 00111, with the value of B2, i.e., 11110, which results in the value "00110". Once the successive-level equivalence-set entry is built, the associated lookup-table entry for that level is derived from information in the equivalence-set entry.

Figure 10:
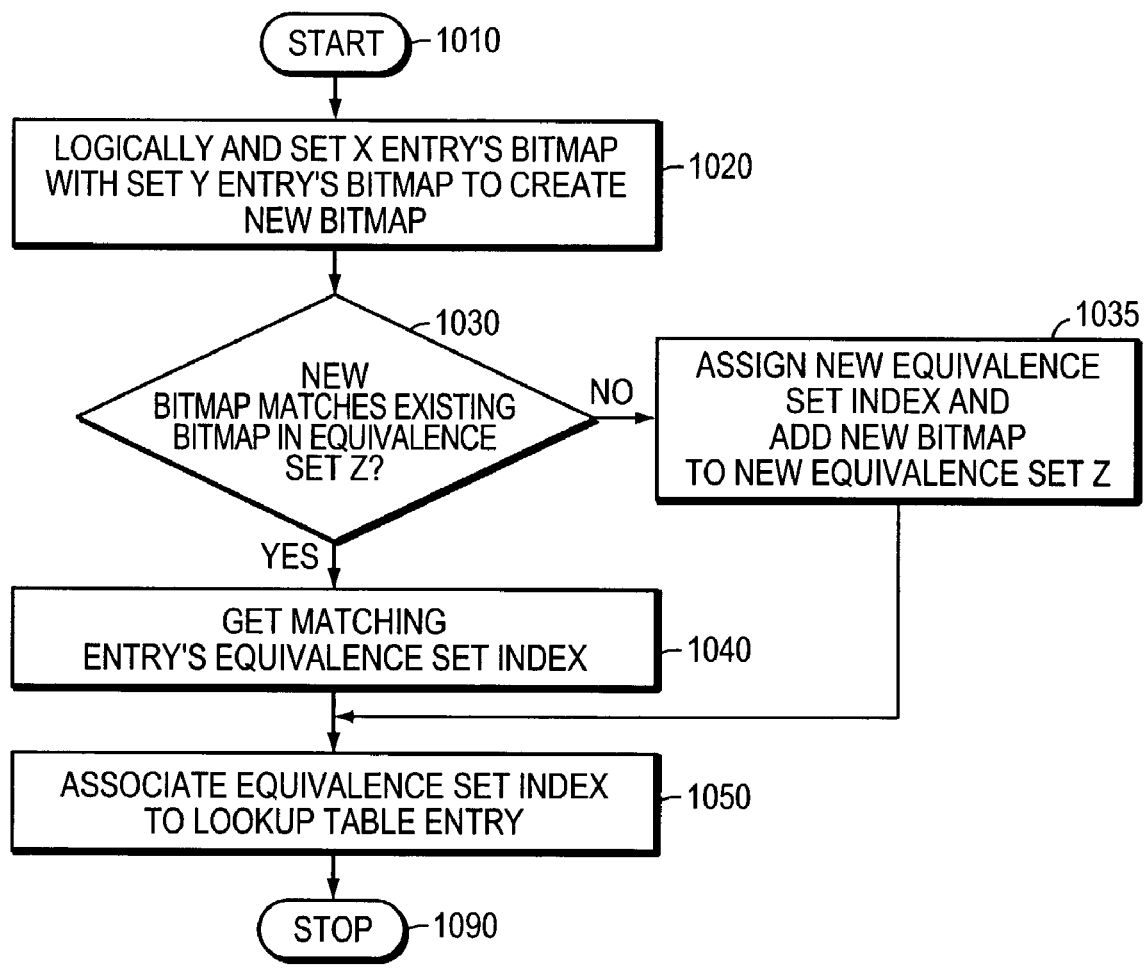
FIG. 10 is a flow diagram of a sequence of steps that can be used to merge two equivalence-set entries to form a new equivalence-set entry and lookup-table entry.

FIG. 10 is a flow diagram of a sequence of steps that can be used to build successive-level equivalence set and associated lookup table entries. Assume equivalence set "X" and "Y" are equivalence sets from a prior level and that equivalence set "Z" is an equivalence set that is associated with a next-level lookup table. Assume further that an entry in equivalence set "X" associated with a first lookup table index is to be merged with an entry in equivalence set "Y" that is associated with a second lookup table index to form a bitmap contained in equivalence set "Z" whose index is associated with the next-level lookup table entry being built, i.e., the entry in the next-level lookup table selected by the combination of the first and second lookup table indices. The sequence begins at Step 1010 and proceeds to Step 1020 where equivalence-set "X" entry's matching rule bitmap is logically ANDed with equivalence-set "Y" entry's matching rule bitmap to produce a new matching rule bitmap that is the cross-product of these two entries. At Step 1030, equivalence set "Z" is searched to determine if an entry exists that matches the new matching rule bitmap. If a matching entry is not found, the sequence proceeds to Step 1035, where the new matching rule bitmap is assigned a new equivalence-set index and placed in equivalence set "Z" at the location selected by the newly assigned index. Otherwise, the sequence proceeds to Step 1040 where the equivalence-set index associated with the matching value is fetched. Next at Step 1050, the equivalence-set index value is associated with the next-level lookup table entry being built. In so doing, the matching rule bitmap is associated with the next-level lookup table entry. The sequence ends at Step 1090.

Figure 11:
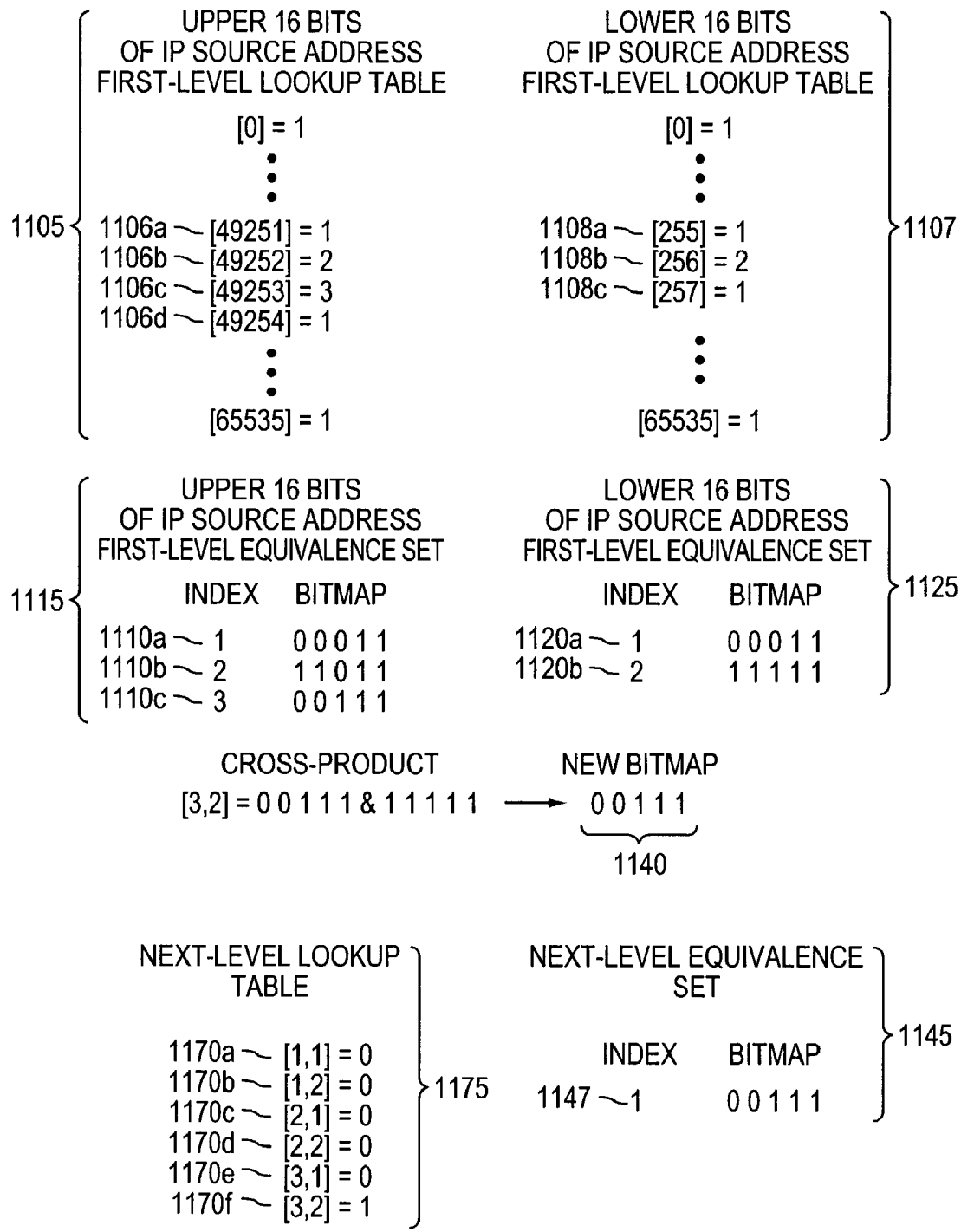
FIG. 11 is an example of the merging of two first-level bitmaps to generate a next-level equivalence-set entry and lookup-table entry.

FIG. 11 illustrates the building of the second-level lookup table and equivalence set entries for the upper and lower 16-bit sections of the IP Source Address of a TCP packet using the above-described techniques. Assume a packet containing an IP source address 192.101.1.0 is being classified. Further assume, the first-level lookup tables and equivalence sets for the sections have been built and the second-level lookup table has been allocated, as described above, and the second-level equivalence set contains no entries. The upper 16 bits of the packet's IP Source Address, i.e., 49253, applied to its section's first-level lookup table 1105 selects entry 1106c and yields a second-level index value of 3, which is associated with entry 1110c in first-level equivalence set 1115. Likewise, the lower 16 bits of the packet's IP Source Address, i.e., 256, applied to its section's first-level lookup table 1107 selects entry 1108b and yields a second-level index value of 2, which is associated with entry 1120b in first-level equivalence set 1125. The matching rule bitmap values associated with entries 1110c and 1120b are then cross-producted, as described above, to produce a new matching rule bitmap 1140. Since the second-level equivalence set 1145 contains no entries, as indicated above, there are no entries that match the bitmap 1140, thus, bitmap 1140 is assigned a new index, i.e., "1," and placed in the equivalence set 1145 at entry 1147 associated with this new index. Next, entry 1147 is associated with the second-level lookup table entry 1170f that is associated with the combined second-level indices, i.e., [3,2], by associating the new index with entry 1170f.

Figure 12:
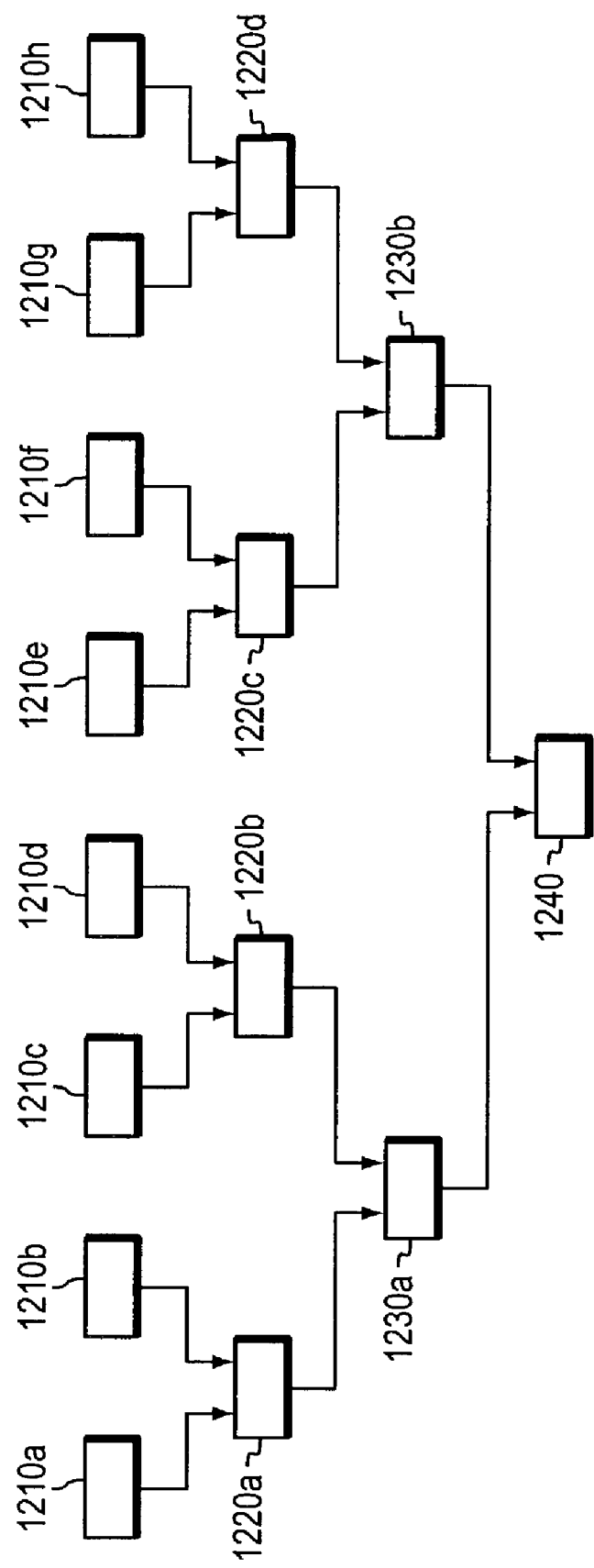
FIG. 12 is an example of how equivalence sets can be merged to form successive-level equivalence sets.

The above-described cross-producting technique is applied continually for each level in the lookup-table hierarchy. FIG. 12 illustrates the merging process as applied to the lookup-table hierarchy for a packet header that is divided into eight sections. Here all eight first-level equivalence-set entries associated with a packet's section values are merged to form four second-level-table and equivalence-set entries. Likewise, these second-level equivalence-set entries are merged to form two third-level table and equivalence-set entries. These third-level equivalence sets, in turn, are merged to form a single fourth-level final lookup table and equivalence set. The end result is a 4-level hierarchy of lookup-table entries and a final-equivalence set that can be used to classify the packet.

Referring again to FIG. 9, after the successive-level entries have been built, the sequence returns to Step 930 and eventually progresses to Step 945, where the next-level indices are examined to determine if they are missing, i.e., zero. Since, as described above, the indices are not zero the sequence proceeds to Step 950 where the next-level indices are applied to the next-level tables to generate indices that are then applied to the next successive level of tables and so on until an index is generated from the final-level table. At Step 960, this index is then used to further process the packet. This processing could include, for example, applying the index to a results table to determine the first matching rule associated with the packet. At Step 990 the sequence ends.

Figure 13:
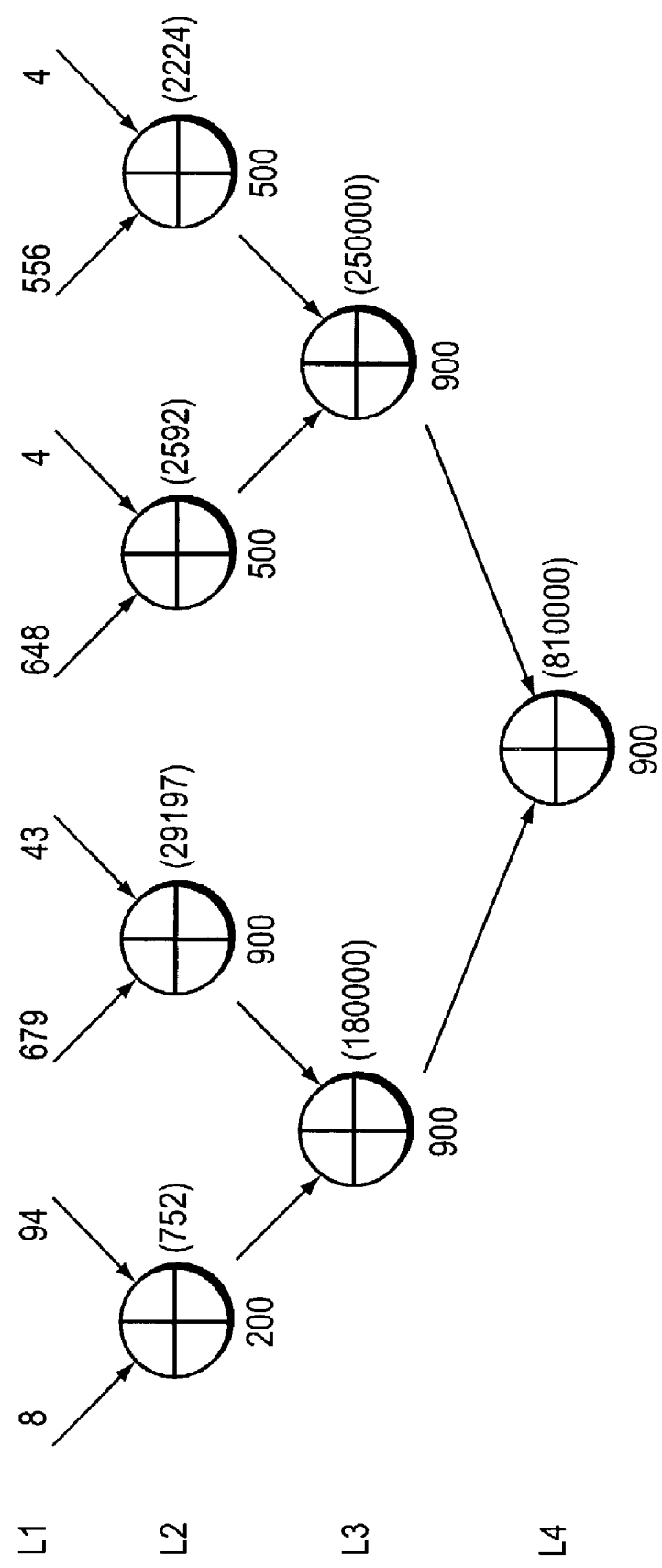
FIG. 13 is an example of a lookup table hierarchy containing estimated lookup-table sizes.

Although the above-described embodiment of the invention pre-allocates a lookup table whose size is based on the product of the number of entries in the prior-level tables, other embodiments of the invention may use other sizes. For example, the size of each pre-allocated lookup table may be based on an estimate. FIG. 13 illustrates a series of lookup tables whose size are based on an estimated value rather than a maximum value. Note that the values for level L1 are actual values. The values represented in parenthesis are maximum values. The non-parenthetic values for levels L2 through L4 are the actual values of the tables, which are estimates. In this embodiment, when a packet is classified, if the first-level indices point to a successive-level lookup table entry that is beyond the allocated table, new lookup tables are allocated using a larger estimated size and the successive-level entries are then built using the newly allocated tables.

In another embodiment of the invention, the size of each lookup table is estimated and a history is kept of the last "N" packets added to the tables. In this embodiment, when new tables are allocated, they are "primed" with entries associated with the packets kept in the history.

In summary, the present invention incorporates a technique for classifying packets in a manner that is both deterministic and efficient. The inventive technique enables packets to be classified without having to completely build all the entries in the lookup tables used to classify the packets. Rather in accordance with the inventive technique, entries are built incrementally as they are used to classify packets. Advantageously, the inventive technique enables packets to be deterministically and efficiently classified without requiring that all possible outcomes be determined before packet classification can take place, thereby saving time and computing resources.

It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for generating a hierarchy of lookup tables for use in classifying a network packet in accordance with an access control list (ACL) containing one or more rules, the hierarchy comprising a first level and one or more successive levels, the method comprising the steps of:
   dividing a packet header contained in the network packet into a plurality of sections wherein each section is associated with a plurality of section values;
   generating a first-level lookup table and equivalence set associated with the first level in the hierarchy for each of the sections wherein the equivalence set contains one or more equivalence-set entries and wherein each equivalence-set entry is associated with one or more rules, and the first-level lookup table containing one or more first-level lookup table entries wherein each first-level lookup table entry associates each section value with an equivalence-set entry;
   allocating one or more successive-level lookup tables for each successive level in the lookup table hierarchy wherein each successive-level lookup table contains one or more successive-level entries;
   initializing the successive-level entries to indicate they are missing;
   creating a matching rule bitmap for each section value;
   determining if the matching rule bitmap matches an entry in the first-level equivalence set and, if not, assigning an equivalence-set index value to the matching rule bitmap and placing the matching rule bitmap in the equivalence set, otherwise, retrieving the equivalence-set index value associated with the matching entry; and
   associating the equivalence-set index value with the first-level lookup table entry associated with the section value.

2. The method of claim 1 wherein each section is the same length.

3. The method of claim 1 wherein the step of creating further comprises the steps of:
   for each rule and each section value, determining if the section value matches the rule; and
   if so, setting a bit in the matching rule bitmap that corresponds to the rule, otherwise, clearing the bit.

4. A method for classifying a network packet in accordance with an access control list (ACL) containing one or more rules using a hierarchy of lookup tables, the hierarchy comprising a first level and one or more successive levels, the method comprising the steps of:
   dividing a packet header contained in the network packet into a plurality of sections wherein each section is associated with a section value;
   applying each section value to a respective first-level lookup table associated with the first level to generate one or more first-level index values;
   applying each first-level index value to a successive-level lookup table associated with the successive level to generate one or more successive-level index values;
   determining if the successive-level index values indicate that successive-level entries contained in the successive-level lookup tables and associated with the successive-level index values are empty;
   if so, building the successive-level entries; and
   using at least one successive-level entry to classify the network packet in accordance with the ACL.

5. The method of claim 4 further comprising the step of:
   applying the first-level index values to the successive-level lookup tables to generate a final-level table index value.

6. The method of claim 5 wherein the step of using further comprises the step of:
   applying the final-level table index to a results table to determine a first matching rule, from the one or more rules, that is associated with the packet.

7. The method of claim 4 wherein the step of determining further comprises the steps of:
   concluding the successive-level entry is empty if the successive-level index values are zero.

8. The method of claim 4 wherein the step of building further comprises the steps of:
   A) calculating the cross-product of a first equivalence-set entry associated with a first lookup table associated with a prior level and a second equivalence-set entry associated with a second lookup table associated with the prior level to generate a next-level-equivalence-set index; and
   B) associating the next-level-equivalence-set index with a successive-level entry.

9. The method of claim 8 further comprising the step of:
   repeating steps A and B for all levels in the lookup table hierarchy.

10. An apparatus for classifying a network packet in accordance with an access control list (ACL) containing one or more rules, using a hierarchy of lookup tables, the hierarchy comprising a first level and one or more successive levels, the apparatus comprising:
    a processor configured to divide a packet header contained in the network packet into a plurality of sections wherein each section is associated with a section value, apply each section value to a respective first-level lookup table associated with the first level to generate one or more first-level index values, apply each first-level index value to a successive-level lookup table associated with the successive level to generate one or more successive-level index values, determine if the successive-level index values indicate that successive-level entries contained in the successive-level lookup tables and associated with the successive-level index values are empty and if so, build the successive-level entries, and use at least one successive-level entry to classify the network packet in accordance with the ACL; and a memory connected to the processor and configured to hold the hierarchy of lookup tables.

11. The apparatus of claim 10 wherein the processor is further configured to apply the first-level index values to the successive-level lookup tables to generate a final-level table index value.

12. The apparatus of claim 11 wherein the processor is further configured to apply the final-level table index to a results table to determine a first matching rule, from the one or more rules, that is associated with the packet.

13. The apparatus of claim 10 wherein the processor is further configured to conclude the successive-level entry is empty if the successive-level index values are zero.

14. The apparatus of claim 10 wherein the processor is further configured to calculate the cross-product of a first equivalence-set entry associated with a first lookup table associated with a prior level and a second equivalence-set entry associated with a second lookup table associated with the prior level to generate a next-level-equivalence-set index; and associate the next-level-equivalence-set index with a successive-level entry.

15. An apparatus for classifying a network packet in accordance with an access control list (ACL) containing one or more rules, using a hierarchy of lookup tables, the hierarchy comprising a first level and one or more successive levels, comprising:
    means for dividing a packet header contained in the network packet into a plurality of sections wherein each section is associated with a section value;
    means for applying each section value to a respective first-level lookup table associated with the first level to generate one or more first-level index values;
    means for applying each first-level index value to a successive-level lookup table associated with the successive level to generate one or more successive-level index values;
    means for determining if the successive-level index values indicate that successive-level entries contained in the successive-level lookup tables and associated with the successive-level index values are empty;
    means for building the successive-level entries; and
    means for using at least one successive-level entry to classify the network packet in accordance with the ACL.

16. The apparatus of claim 15 further comprising:
    means for applying the first-level index values to the successive-level lookup tables to generate a final-level table index value.

17. The apparatus of claim 16 wherein the means for using further comprise:
    means for applying the final-level table index to a results table to determine a first matching rule from the one or more rules that is associated with the packet.

18. The apparatus of claim 15 further comprising:
    means for calculating the cross-product of a first equivalence-set entry associated with a first lookup table associated with a prior level and a second equivalence-set entry associated with a second lookup table associated with the prior level to generate a next-level-equivalence-set index; and
    means for associating the next-level-equivalence-set index with a successive-level entry.

19. A computer readable media comprising computer executable instructions for execution in a processor for:
    dividing a packet header contained in the network packet into a plurality of sections wherein each section is associated with a plurality of section values;
    generating a first-level lookup table and equivalence set associated with the first level in the hierarchy for each of the sections wherein the equivalence set contains one or more equivalence-set entries and wherein each equivalence-set entry is associated with one or more rules, and the first-level lookup table containing one or more first-level lookup table entries wherein each first-level lookup table entry associates each section value with an equivalence-set entry;
    allocating one or more successive-level lookup tables for each successive level in the lookup table hierarchy wherein each successive-level lookup table contains one or more successive-level entries;
    initializing the successive-level entries to indicate they are missing;
    creating a matching rule bitmap for each section value;
    determining if the matching rule bitmap matches an entry in the first-level equivalence set and, if not, assigning an equivalence-set index value to the matching rule bitmap and placing the matching rule bitmap in the equivalence set, otherwise, retrieving the equivalence-set index value associated with the matching entry; and
    associating the equivalence-set index value with the first-level lookup table entry associated with the section value.

20. A computer readable media comprising computer executable instructions for execution in a processor for:
    dividing a packet header contained in a network packet into a plurality of sections wherein each section is associated with a section value;
    applying each section value to a respective first-level lookup table associated with the first level to generate one or more first-level index values;
    applying each first-level index value to a successive-level lookup table associated with the successive level to generate one or more successive-level index values;
    determining if the successive-level index values indicate that successive-level entries contained in the successive-level lookup tables and associated with the successive-level index values are empty;
    if so, building the successive-level entries; and
    using at least one successive-level entry to classify the network packet.

* * * * *